United States Patent [19]

Iyengar

[11] Patent Number: 4,533,570
[45] Date of Patent: Aug. 6, 1985

[54] METHOD AND APPARATUS FOR COATING OPTICAL WAVEGUIDE FIBERS

[75] Inventor: Rama Iyengar, Lilburn, Ga.

[73] Assignee: AT&T Technologies, Inc., Berkeley Heights, N.J.

[21] Appl. No.: 502,882

[22] Filed: Jun. 9, 1983

Related U.S. Application Data

[63] Continuation of Ser. No. 369,874, Apr. 19, 1982, abandoned, which is a continuation-in-part of Ser. No. 265,713, May 20, 1981, abandoned.

[51] Int. Cl.³ ............................ G02B 1/10; G02B 5/14
[52] U.S. Cl. .................................. 427/163; 427/434.7; 118/405; 118/DIG. 18; 118/DIG. 19
[58] Field of Search ............ 427/117, 120, 163, 434.7; 118/405, DIG. 18, DIG. 19

[56] References Cited

U.S. PATENT DOCUMENTS

| | | | |
|---|---|---|---|
| 1,454,224 | 5/1923 | Schmidt | 427/434.7 |
| 2,386,818 | 10/1945 | Seavey | 264/174 |
| 4,073,974 | 2/1978 | Albarino et al. | 427/434.6 |
| 4,194,462 | 3/1980 | Knowles | 118/405 |
| 4,237,186 | 12/1980 | Ingraham | 427/117 |
| 4,246,299 | 1/1981 | Ohls | 427/163 |

Primary Examiner—Richard Bueker
Attorney, Agent, or Firm—Don P. Bush

[57] ABSTRACT

Methods and apparatuses are disclosed for coating elongated materials such as optical fibers wherein a shear force is developed by the elongated material moving through liquid coating material in a coating applicator of a magnitude such as to prevent the coating material from flooding the applicator.

2 Claims, 4 Drawing Figures

METHOD AND APPARATUS FOR COATING OPTICAL WAVEGUIDE FIBERS

This is a continuation of application Ser. No. 369,874, filed Apr. 19, 1982, abandoned, which is a continuation-in-part of application Ser. No. 265,715 filed May 20, 1981, now abandoned.

TECHNICAL FIELD

In the manufacture of optical fiber the fiber is typically drawn from a heated, rod-shaped, glassy preform. In order to protect the drawn fiber it is coated with a thin layer of an organic or inorganic coating material immediately after it is drawn. This coating serves to prevent airbourne particles from impinging upon and adhering to the surface of the just-drawn fiber which would serve to weaken it. The coating also shields the fiber from surface defects inflicted by subsequent manufacturing processes and installation handling.

Optical waveguide fibers have heretofore been coated by being passed downwardly through an applicator containing a viscous liquid coating material. The applicator has typically been of cup-shaped configuration having an open top, with or without a covering air filter, and a die located in a dependent tip. As the liquid coating material is drawn by the fiber from the applicator it is replenished from an elevated reservoir by actuation of a valve in response to sensed levels of the liquid within the applicator.

Unfortunately, coatings applied in the just described manner have not been fully uniform in thickness and have still contained impurities. These nonuniformities have been occasioned by air bubbles drawn down into the liquid adjacent the fiber by the moving fiber and by the substantial liquid surface area open to ambient atmosphere. The replenishment control system for the applicator has also been complex and in need of frequent attention.

More specifically, the presence of a large surface area renders the coating liquid in the applicator susceptible to receiving airbourne particles from ambient atmosphere. The presence of a large surface area also enables a meniscus to be formed about the filament as it is drawn down into and, in doing so, agitates the liquid. From this meniscus small bubbles tend to break loose and to adhere to the surface of the filament. These bubbles create small discontinuities in the coating which weaken the fiber. Particulate matter adhering to the fiber surface also creates points of fiber weakness.

Recently, coating applicators have been devised to prevent the generation and entrapment of air bubbles within the coating liquid in an effort to prevent the formation of such flaws in the fiber coating. U.S. Pat. No. 4,246,299, for example, teaches an applicator having a die body that defines a small, vertically oriented, tapered aperture encircled by a reservoir. A series of radial ports provides fluid communication between the reservoir and aperture. With this type applicator a fiber may be passed down through the small aperture in the die body without creating the turbulence that generates air bubbles as has been done with use of the cup-shaped applicators. The level of liquid coating material is achieved and maintained in the small aperture by preselection of the number and size of the radial ports between the aperture and reservoir. Thus, one particular size and number of radial ports produces one specific level of liquid coating material within the applicator aperture at one operating speed. However, should the draw speed of the fiber be changed, the aperture can become quickly flooded or starved. This has, therefore, been a limiting factor on the practical utility of this type of coating apparatus where different coating materials and different draw speeds are contemplated.

Accordingly, it is seen that a need remains for the provision of methods and apparatuses for coating elongated materials such as optical waveguide fibers in which the level of coating fluid can be maintained within a small range at diverse draw speeds, and also in which air bubbles do not tend to be formed en masse and adhere to the material nor airbourne particles tend to enter the fluid. It is to this task to which the present invention is primarily directed.

SUMMARY OF THE INVENTION

In one form of the invention a method is provided for coating elongated material such as optical waveguide fiber wherein an applicator is provided having a channel extending therethrough that is in fluid communication with a source of liquid coating material which is fed into the applicator channel under fluid pressure. The elongated material is passed into an entry end of the applicator channel and through the liquid coating material located therein at a speed such as to create a shear force in the liquid sufficient to prevent it under its fluid pressure from exiting the applicator through the channel entry end.

In another form of the invention a method is provided for coating elongated material which comprises the steps of providing an applicator having a channel extending generally vertically therethrough in fluid communication with a liquid coating material applied reservoir elevated above the applicator channel. Liquid is gravitated from the elevated reservoir down into the applicator channel. The elongated material is passed downwardly through the liquid in the applicator channel at a speed such as to create a shear force in the liquid sufficient to prevent it from rising to the level of the liquid in the reservoir and thereby overflowing the applicator.

In another form of the invention apparatus is provided for coating elongated material which comprises an applicator having a channel extending therethrough and means for supplying the applicator with liquid coating material under fluid pressure. Means are further provided for passing the elongated material into an entry end of the applicator channel and through the liquid coating material therein at a speed such as to create a shear force in the liquid within the channel sufficient to prevent it under its fluid pressure from exiting the applicator through the channel entry end.

In still another form of the invention apparatus is provided for coating elongated material of specified thickness. The apparatus comprises an applicator having a substantially vertical channel at least a portion of which is of a width of preselected dimension greater than the elongated material thickness. A reservoir is mounted at a height such that a body of liquid coating material may be contained therein with its surface elevated above the applicator channel portion. Conduit means provide fluid communication between the reservoir and the applicator channel at a height below the channel portion. Means are also provided for passing the elongated material downwardly through the apparatus channel at a speed proportional to the relative size of the channel width to the material thickness to create a shear force in the liquid within the channel portion of the applicator sufficient to prevent it from rising to the level of the liquid in the reservoir and thereby overflowing the applicator.

DETAILED DESCRIPTION

Figures 1, 4:
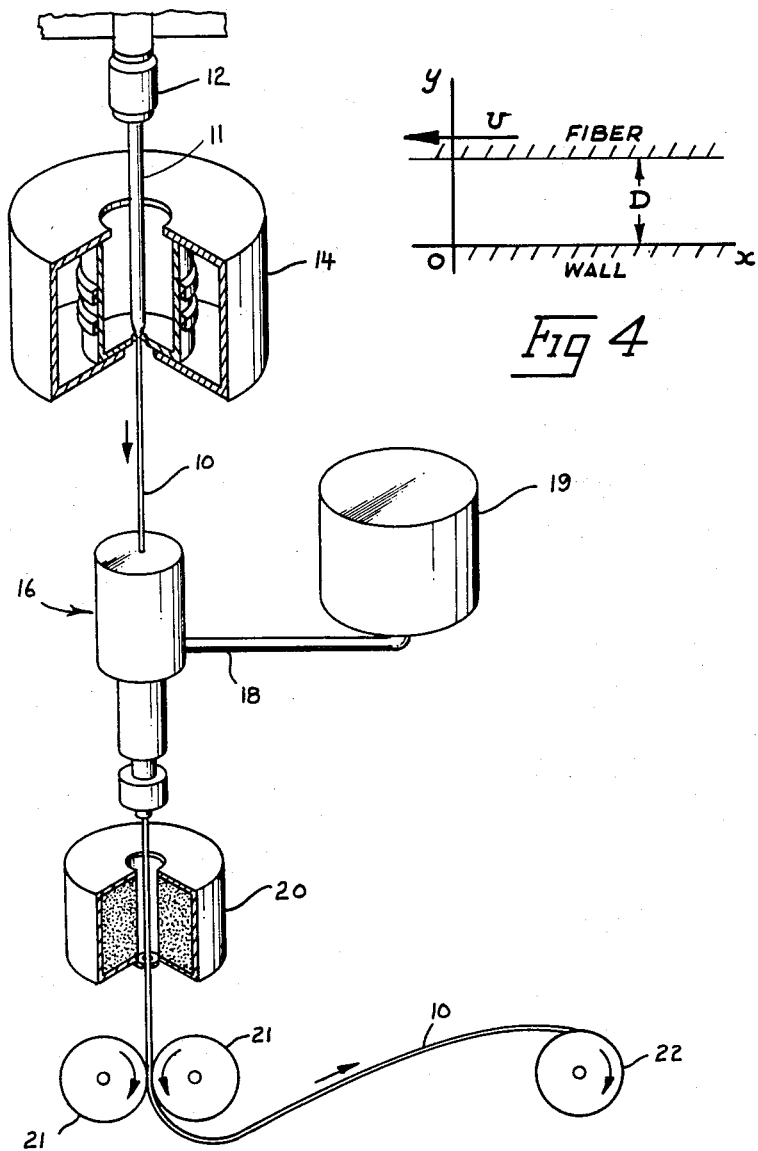
FIG. 1 is a perspective view, portions of which are schematically illustrated, of apparatus for drawing optical fiber from a preform and for coating, curing and reeling the drawn fiber.
FIG. 4 is a diagrammatical view of a longitudinal portion of the fiber and channel wall shown in FIG. 3.

Referring now in more detail to the drawing, there is shown in FIG. 1 an optical fiber 10 being drawn from an optical fiber preform 11 that is suspended from a chuck 12 down into a furnace 14. The fiber is seen to pass through a coating applicator 16 which is supplied with liquid coating material via a conduit 18 from a reservoir 19 elevated above the applicator which reservoir may be pressurized, as indicated. The fiber is further seen to pass through a curing oven 20 positioned beneath the coating applicator 16 and a pair of drive pinch rollers 21 to a takeup reel 22. With this system, all of which is conventional as yet described, fiber may draw from the preform heated within oven 14 down through the coating applicator 16 which coats the fiber with a protective liquid. From the coating applicator the fiber is further drawn down through a curing oven 20 which cures the coating material and then through pinch rollers 21 and onto the takeup reel 22.

Figures 2, 3:
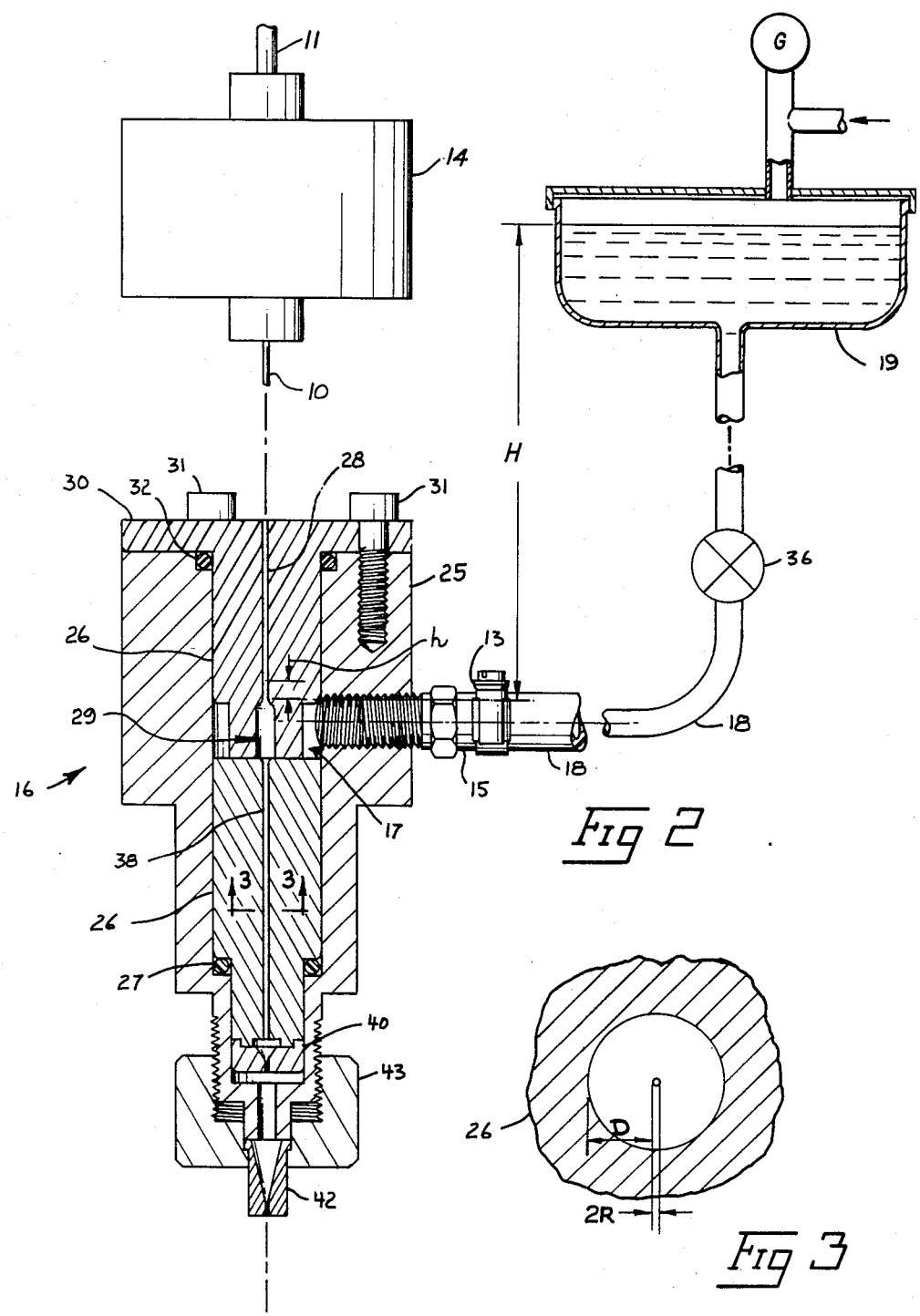
FIG. 2 is a side-elevational view, in cross-section, of the coating applicator component of the apparatus illustrated in FIG. 1.
FIG. 3 is a transverse cross-sectional view taken along plane 3—3 of the channel portion of the coating applicator illustrated in FIG. 2.

In FIG. 2 the coating applicator 16 is seen in more detail to include a housing 25 into a cylindrical bore of which a two piece insert 26 is seated upon a lower O-ring 27 which itself is seated atop a step within the housing. The insert upper piece defines a small, cylindrical channel 28 which extends from the top 30 of the insert to a slot-shaped cavity 29 that opens at both ends into an annular cavity 17 located between the insert and housing. An upper O-ring 32 is positioned upon a step in the housing beneath the insert top. A pipe fitting 15 is threadedly received within a side channel of the housing with its outlet positioned within the annular cavity 17. A hose 18 is secured by a hose clamp 13 snuggly to an exposed portion of the fitting extending outwardly from aside the housing. The hose extends to the reservoir 19 located above the applicator through an on/off valve 36. A guiding die 40 is press fitted to the bottom of the insert to receive fluid from the bottom of channel 38 in the lower piece of the insert. Finally, a sizing die 42 is mounted by a nut 43 to the bottom of the insert 26.

In operation the reservoir 19 is filled to a level H above the bottom of channel 28 with a liquid coating material with the valve 36 in a closed position. For coating optical fiber the coating material may be an ethyl acrylate or any of a number of other suitable fiber coating materials. An optical fiber 10 is then drawn from the bottom of the optical fiber preform 11 positioned within the oven 14 with the draw speed of the fiber controlled by the speed of the motor driven pinch rollers 21. The fiber passes completely through the coating applicator 16 though, for purposes of clarity, it is shown broken off in FIG. 2 just beneath the oven 14.

With the fiber now threaded through the applicator and other components of the system shown in FIG. 1, the valve 36 is opened thereby enabling liquid coating material to gravitate downwardly from reservoir 19 through conduit 18 and into the applicator channel 17. From here the fluid flows into channel 29 and into contact with the fiber from opposite sides thereof. This routing of the liquid serves to maintain the fiber centered within the applicator channels 28 and 38. The coating material then fills the lower channel 38 and the dies 40 and 42.

For a given speed of fiber movement through the applicator, for a given viscosity of the coating material, and for selected fiber and channel dimensions the fiber creates a shear or drag force within the liquid which has flowed upwardly into the channel 28 above the channel 17. As hereafter explained in more detail this shear force is of a magnitude such as to limit the level of the coating material to a height h above the bottom of channel 28. Due to the small size of the channel 28 very few bubbles are generated and entrapped within the slender column of coating material. Furthermore, since only a very small surface area of the liquid is opened to ambient atmosphere very few airborne particles enter and become entrained with the coating material.

From the channel 28 the fiber passes downwardly through the liquid filled channels 29 and 38 in the lower portion of the insert and then through the guiding die 40. Finally the fiber passes through the sizing die which sizes the coating thickness.

In one particular case an optical fiber of 0.124 millimeters diameter was passed at a speed of 1 meter/second through an applicator of the type as illustrated in FIG. 2 with the channel 28 having a diameter of 5 millimeters. The reservoir 19 was filled with an ethyl acrylic coating material having a density of 1 gm/cc and a viscosity of $1,500 \pm 50$ cp at 72° F. to a height H of 250 mm. The sizing die 42 was selected to provide a coating of 0.240 millimeters outside diameter. Under these conditions the coating material was found to achieve a steady height h within channel 28 of 2.5 millimeters. Discontinuities in the coating from the presence of either air bubbles (voids) or impurities were observed to be only very minor. Once the reservoir was depleted with liquid level having dropped to a height H of 120 mm the height h of the liquid within applicator channel 28 was found to have lowered only to 1.2 mm.

Should the draw speed of the fiber be significantly altered the height h will change very little. An appreciation of this may be had by consideration of the following analysis in conjunction with FIGS. 3 and 4. Where a cylindrical fiber 10 is passed through the cylindrical channel 28 with its surface spaced from the channel wall a distance D, then to the first approximation, i.e., excluding such minor considerations as changes of viscosity with temperature and assuming isothermal operation, $$\frac{dP}{dx} = \mu \cdot \frac{\delta^2 V}{\delta y^2} \text{ or } \frac{\delta^2 V}{\delta y^2} = \frac{1}{\mu} \cdot \frac{dP}{dx} \qquad (1)$$

where P is fluid pressure, x and y are coordinate directions as indicated in FIG. 4, $\mu$ is viscosity of the coating material and V is the velocity of the liquid. Integrating twice to determine the instantaneous velocity V, $$V = \frac{1}{\mu} \cdot \frac{dP}{dx} \cdot \frac{y^2}{2} + C_1 y + C_2$$

where $C_1$ and $C_2$ are constants determined as follows: Applying the boundary conditions $$y=0, \ V=0; \ y=D, \ V=U$$

where U is the velocity of the fiber and D is the clearance between fiber surface and channel wall surface results in $$C_1 = \frac{U}{D} - \frac{1}{\mu} \cdot \frac{dP}{dx} \cdot \frac{D}{2} \text{ and } C_2 = 0$$

from which $$V = \frac{1}{2\mu} \cdot \frac{dP}{dx} [y^2 - yD] + U\left(\frac{y}{D}\right) \quad (2)$$

If Q is the total outflow of liquid from the applicator then $$\int_0^D V \cdot 2\pi(R + D - y) \cdot dy = Q \quad (3)$$

where R is the radius of the fiber as shown in FIG. 3, which results in $$\frac{dP}{dx} = \frac{-\frac{Q}{2\pi} + \frac{D^2 U}{6} + \frac{URD}{2}}{\frac{RD^3}{12\mu} + \frac{D^4}{24\mu}} \quad (4)$$

From Equation (4)

$$P = f(D) \cdot x$$

where $$f(D) = \frac{-\frac{Q}{2\pi} + \frac{D^2 U}{6} + \frac{URD}{2}}{\frac{RD^3}{12\mu} + \frac{D^4}{24\mu}}$$

If $\rho$ is the density of the liquid then $$\rho H = P = f(D) \cdot h \quad (5)$$

where h is the height of the liquid in channel 28. And from Equation (5)

$$h = \rho H / f(D) \quad (6)$$

This analysis reveals that the height h of the liquid within the channel 28 is very sensitive to the radial clearance D between the fiber and channel wall. This is believed to be due to the fact that the shear force magnitude is a function of this clearance. On the other hand the height h varies little with changes in reservoir liquid surface height H. Furthermore, an increase in fiber speed causes but a minor decrease in the height h, with almost no chance for h going to zero, while substantial decreases in speed are permitting without flooding. Therefore, radial clearance selection may be made to accommodate a relatively wide range of fiber draw speeds without danger of applicator overflow.

The presence of the shear force acting against the head pressure of the liquid coating material has the additional attribute of dramatically increasing the fluid pressure of the liquid material within the applicator. It is possible, in fact, to pressurize the reservoir such as by a magnitude in the order of 30 to 40 psi, which has the effect of increasing H since $P = H\rho$, without causing the coating material to flood or blow out of the applicator material entry end. This provides a two-fold benefit. Firstly, the increased pressure inhibits air bubbles from descending far into the fluid from the previously mentioned meniscus at the surface of the coating material. In other words the augmented pressure tends to act as to bubble barrier. This inhibits the formation of coating discontinuities. Secondly, the increased pressure serves to center the elongated material better as it passes through the die at the material outlet end of the applicator channel. This promotes radial uniformity of coating thickness.

The following table selected for an uncoated fiber of 0.125 mm diameter, a coated fiber of 0.240 mm diameter and 1500±50 cp viscosity coating material illustrates this wherein the table's value are dimensionless ratios of h to H.

TABLE I

| | (1 h/H 0) | | | |
|---|---|---|---|---|
| | D(mm) | | | |
| Um/sec | 1.5 | 2.5 | 5 | 10 |
| 0.5 | .0076 | .022 | .088 | .352 |
| 1.0 | .0038 | .011 | .044 | .176 |
| 2.0 | .0019 | .0055 | .022 | .088 |
| 5.0 | .00076 | .0022 | .0088 | .0352 |

It thus is seen that a method and apparatus are provided for coating elongated material in which the level of coating fluid can be maintained within a small range of value at diverse material speeds. In addition, air bubbles do not tend to be formed en masse and adhere to the material nor airbourne particles tend to enter the coating material. Though fluid pressure is obtained by elevation of the reservoir, such also could be achieved with pump means. Furthermore, though the invention has been shown in an optical waveguide fiber coating application, its principles may be employed elsewhere. It thus should be understood that the just described embodiment merely illustrates principles of the invention in one preferred form. Many modifications, additions and deletions may be made thereto without departure from the spirit and scope of the invention as set forth in the following claims.

What is claimed is:

1. A method of coating an optical fiber being drawn from a heated, rod-shaped glassy preform comprising the steps of passing the optical fiber downwardly through an applicator containing a viscous liquid coating material, the applicator having a channel extending therethrough from a channel entry end to a coating sizing die channel exit end, the channel being in fluid communication with viscous liquid coating material being supplied by a reservoir, passing the optical fiber downwardly through a restricted open end of a relatively long narrowly confined passage from the entry end of the channel passage to a relatively short and large passage at an intermediate portion of the channel, the narrowly confined passage having a relatively small amount of clearance between the wall thereof and the surface of the fiber passing therethrough, the short and large passage being relatively short compared to the narrowly confined passage and having a cross-sectional area substantially larger than that of the narrowly confined passage and that of the fiber, feeding the viscous liquid coating material under pressure from the reservoir of the viscous liquid coating material at a relatively high pressure into the relatively short and large passage in the applicator through a passageway including at least one aperture in the channel and into the relatively long narrowly confined passage while passing the fiber through the applicator channel at a velocity relative to the viscosity of the coating material and a relatively narrow spacing between the fiber and the wall of the narrowly confined passage such as to create relatively higher shear forces in the liquid coating material contained therein sufficient to cause an action on the fiber which prevents the coating material under its fluid pressure from exiting the applicator through the relatively long narrowly confined passage whereby due to the relatively high fluid pressure of the coating material created by the relatively high shear forces creates a bubble barrier therein and air bubbles tend to be inhibited from being drawn from ambient atmosphere into the liquid coating material, since only a relatively small surface area of the viscous liquid coating material between the fiber and wall of the narrowly confined passage is exposed to ambient atmosphere bubbles are inhibited from being formed in the viscous liquid coating material and descending in the liquid coating material in the relatively long narrow confined passage in the channel, and causing the fiber to move through a lower relatively long and narrowly confined cylindrical passage having a diameter slightly larger than that of the narrowly confined passage at the entrance end of the channel and on to the sizing die at the exit end of the applicator to create additional relatively high shear forces in the coating material and cause a still higher pressure in the coating material which tends to inhibit any bubbles of air which may tend to be entrained by the fiber from passing on through the applicator on the liquid coated fibers, with centering of the elongated material in the sizing die also being improved as result of a relatively extremely high pressure in the coating material as a result of the relatively high shear forces.

2. The method of coating an optical fiber of claim 1 wherein the reservoir for the coating material is at least partially filled with liquid coating material and is pressurized to at least 30 psi above atmospheric pressure and wherein the velocity of optical fiber may remain constant as the supply of the liquid coating material in the reservoir approaches depletion.

* * * * *